Aug. 9, 1938.   R. W. LEACH   2,126,020
VALVE FOR CONTROLLING FLUIDS
Filed June 16, 1937   2 Sheets-Sheet 2

R. W. Leach
Inventor

Patented Aug. 9, 1938

2,126,020

UNITED STATES PATENT OFFICE 2,126,020

VALVE FOR CONTROLLING FLUIDS

Robert William Leach, Newport, England, assignor of one-half to Audley Engineering Company Limited, Newport, England Application June 16, 1937, Serial No. 148,601
In Great Britain March 4, 1937

2 Claims. (Cl. 251—84)

This invention relates to fluid controlling valves of the kind in which the closure member is in the form of a rotary disc having one of its faces adapted to co-operate with a complementary seating surface.

The object of the invention is to minimize leakage past any of the working surfaces of such a valve under the action of high fluid pressure.

The invention comprises the combination of a valve body, a closure member in the form of a rotary disc, a flat ported seating for the said closure member in the said body, an operating stem extending through the said body from the said closure member and having an axial lubricant supply passage formed therein, a lubricant delivery chamber formed in the said body and communicating with the inner end of the said passage, a piston for forcing lubricant from the said chamber between the said closure member and seating, an adjustable thrust bearing whereby axial pressure can be exerted on the outer part of the said stem in the direction for holding the said closure member on the said seating, the said thrust bearing being arranged around the said stem at a position adjacent to its outer end, a gland surrounding the said stem at the inner side of the said thrust bearing, an operating handle attached to the said stem between the said thrust bearing and gland, a lubricant storage chamber formed in the stem at the outer end of the said lubricant supply passage, and a plug in the outer end of the said stem for forcing lubricant from the said storage chamber through the said passage to the said delivery chamber.

The term lubricant is herein intended to include not only normal lubricating substances, but also substances of a plastic nature whose main purpose is to effect a sealing of any small clearances between the various working surfaces of the valve through which the fluid controlled by the valve might leak.

In the two accompanying sheets of explanatory drawings:—

Figure 1:
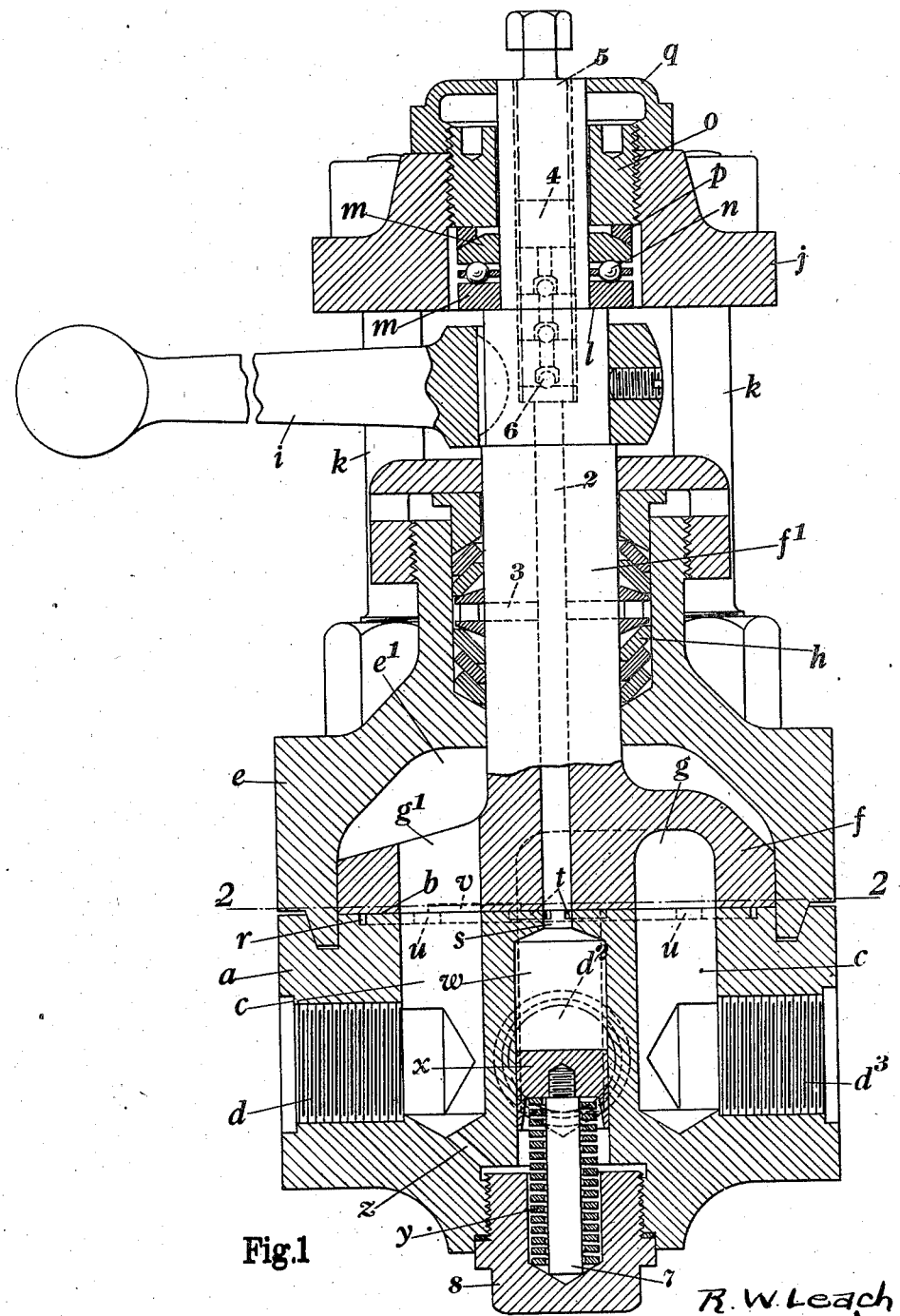
Figure 2:
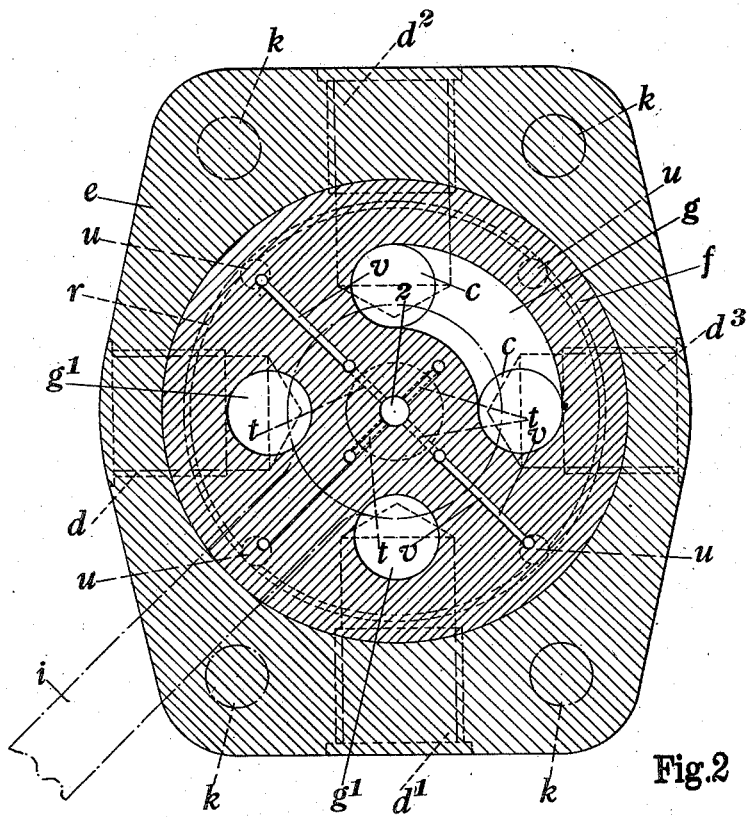

Figure 1 is a sectional elevation of a valve constructed in accordance with the invention, and Figure 2 is a section on the line 2—2 of Figure 1.

In carrying the invention into effect as shown I provide in the body part $a$ of the valve, a flat seating surface $b$ having ports $c$ communicating respectively with fluid inlet and outlet passages $d$, $d^1$, $d^2$, and $d^3$ in the body part. On to this part is secured a hollow cover piece $e$ forming a chamber in which is contained the rotary disc-like closure member $f$ which is adapted to control the ports $c$ in the seating surface. When the closure member is in the position shown the ports $c$ communicating with the passages $d^2$, $d^3$ are interconnected by an arcuate groove or channel $g$ in the surface of the closure member co-acting with the seating surface $b$, and the ports $c$ communicating with the passages $d$, $d^1$ are interconnected by holes $g^1$ in the closure member and the space $e^1$ in the chamber $e$ above this member. By moving the closure member from the position shown through 90° in a clockwise direction the ports $c$ communicating with the passages $d$, $d^2$, are interconnected by the holes $g^1$ and the space $e^1$, and the other ports $c$ are interconnected by the groove or channel $g$. The pressure fluid in the space $e^1$ serves to assist in holding the closure member on the seating surface.

From the outer side of the closure member $f$ there extends an axially arranged operating stem $f^1$ which passes through a gland $h$ to the exterior of the cover piece $e$, and on this stem near its outer end there is attached an operating handle $i$. Adjacent to the portion of the stem which extends beyond the handle $i$ there is arranged a cross head $j$ which is secured to the cover piece $e$ and body part $a$ by a plurality of pillars $k$, and in this cross head is mounted a thrust bearing which co-operates with a shoulder $l$ on the stem. Preferably this bearing comprises a pair of collars $m$ having balls $n$ or rollers between their adjacent faces. One of the collars $m$ (the lowermost in the example shown) abuts on the stem shoulder $l$. The other is acted on by an adjustable screw threaded bush $o$ carried in the cross head $j$. By suitably adjusting this bush any desired pressure can be exerted through the bearing $m$, $n$ and stem $f^1$ on the closure member $f$ for holding the latter in tight contact with its seating $b$. To compensate for any mechanical inaccuracy in the construction of the thrust bearing $m$, $n$ and stem $f^1$, the upper collar $m$ may have a rounded outer face on which rests a complementary ring $p$ interposed between the bearing and the bush $o$, this arrangement serving to provide a spherical or ball and socket like connection between the bush and bearing. Also a cap $q$ may be screwed on the bush $o$ and secured by welding or otherwise on the cross head $j$ above the bush to prevent unauthorized interference with the bush after it has been properly adjusted.

By means of the thrust bearing above described any desired pressure may be imposed on the closure member to resist the action of the pressure fluid controlled by the valve, and this condition is satisfied without interfering with the desired freedom of rotation of the closure member by the handle. The pressure exerted on the closure member by the thrust bearing is supplemented by the fluid pressure in the manner already described.

To minimize risk of leakage of fluid between the seating surface $b$ and the closure member $f$, I form in the seating surface near its outer periphery a circular groove $r$. Also I form in the centre of this surface a hole $s$ from which extend outwardly a plurality of short radial grooves $t$. When the closure member $f$ is in certain positions, these radial grooves are connected to openings $u$ leading to the circular groove $r$ by other and relatively long radial grooves $v$ formed in the adjacent surface of the closure member. But in other positions, and while the closure member is being moved from one position to another, the radial grooves $v$ interrupt the communication between the other grooves. Lubricant is supplied to the hole $s$ in the seating surface from an axially arranged chamber $w$ in the body part under the action of a piston $x$ in the chamber, the piston being subject to the action of a spring $y$, or fluid pressure, or both. In the example shown the pressure fluid controlled by the valve is admitted to the underside of the piston $x$ through a passage $z$ in the body part, and supplements the action of the spring $y$ on the piston. The spring $y$ is preferably supported laterally by a guide rod 7 attached to the piston $x$ and the support for its lower end is provided in a removable plug 8 screwed into the body part.

Further, to minimize risk of leakage past the gland $h$, the closure member $f$ and stem $f^1$ are formed with a central axial bore 2 extending from the hole $s$ in the seating surface and communicating with radial passages 3 in the stem which conduct lubricant from the bore to the interior of the gland.

Replenishing of the lubricant chamber $w$ can be effected from a lubricant storage chamber 4 formed in or provided on the outer end of the stem $f^1$ and having a screwed plug 5 whereby lubricant can be forced from the storage chamber 4 to the chamber $w$ past a non-return valve 6, or (as shown) a series of such valves.

By this invention the maintenance of the desired fluid tight condition under heavy pressures can be effected in valves of the kind specified in a very simple and satisfactory manner.

Having thus described my invention what I claim as new and desire to secure by Letters Patent is:—

1. A fluid controlling valve comprising the combination of a valve body, a closure member in the form of a rotary disc, a flat ported seating for the said closure member in the said body, an operating stem extending through the said body from the said closure member and having an axial lubricant supply passage formed therein, a lubricant delivery chamber formed in the said body and communicating with the inner end of the said passage, a piston for forcing lubricant from the said chamber between the said closure member and seating, an adjustable thrust bearing whereby axial pressure can be exerted on the outer part of the said stem in the direction for holding the said closure member on the said seating, the said thrust bearing being arranged around the said stem at a position adjacent to its outer end, a gland surrounding the said stem at the inner side of the said thrust bearing, an operating handle attached to the said stem between the said thrust bearing and gland, a lubricant storage chamber formed in the stem at the outer end of the said lubricant supply passage, and a plug in the outer end of the said stem for forcing lubricant from the said storage chamber through the said passage to the said delivery chamber.

2. A fluid controlling valve comprising the combination of a valve body, a closure member in the form of a rotary disc, a flat ported seating for the said closure member in the said body, an operating stem extending through the said body from the said closure member and having an axial lubricant supply passage formed therein, a lubricant delivery chamber formed in the said body and communicating with the inner end of the said passage, a piston for forcing lubricant from the said chamber between the said closure member and seating, a thrust bearing arranged around the said stem at a position adjacent to its outer end, an adjustable screw threaded bush whereby axial pressure can be exerted on the outer side of the said thrust bearing for causing the said stem to hold the said closure member on the said seating, a cross head carrying the said bush, a cover piece enclosing the outer end of the said bush and surrounding the outer end of the said stem, a gland surrounding the said stem at the inner side of the said thrust bearing, an operating handle attached to the said stem between the said thrust bearing and gland, a lubricant storage chamber formed in the said stem at the outer end of the said lubricant supply passage, and a plug in the outer end of the said stem for forcing lubricant from the said storage chamber through the said passage to the said delivery chamber.

ROBERT WILLIAM LEACH.